(12) United States Patent
Chen et al.

(10) Patent No.: US 8,958,430 B2
(45) Date of Patent: Feb. 17, 2015

(54) OSPF NON-STOP ROUTING FROZEN STANDBY

(75) Inventors: Ing-Wher Chen, San Jose, CA (US); Wenhu Lu, San Jose, CA (US); Alfred C. Lindem, III, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 219 days.

(21) Appl. No.: 13/349,530

(22) Filed: Jan. 12, 2012

(65) Prior Publication Data

US 2013/0083802 A1    Apr. 4, 2013

Related U.S. Application Data

(60) Provisional application No. 61/541,067, filed on Sep. 29, 2011.

(51) Int. Cl.
*H04L 12/28* (2006.01)
*H04L 12/56* (2006.01)
*H04L 12/721* (2013.01)
*H04L 12/703* (2013.01)

(52) U.S. Cl.
CPC ............... *H04L 45/12* (2013.01); *H04L 45/28* (2013.01); *H04L 45/123* (2013.01)
USPC ........... 370/401; 370/221; 370/238; 370/312; 370/329; 370/338; 370/254; 370/346; 370/352; 370/389; 709/230; 709/232

(58) Field of Classification Search
CPC ......... H04L 45/02; H04L 45/00; H04L 69/40; H04L 45/586; H04L 45/60; H04L 49/552; H04L 45/12; H04L 45/28; H04L 45/023; H04L 45/58

USPC ........................... 370/208–509; 709/223–242
See application file for complete search history.

(56) References Cited

U.S. PATENT DOCUMENTS

| | | | |
|---|---|---|---|
| 6,856,627 B2 | 2/2005 | Saleh et al. | |
| 6,950,427 B1 * | 9/2005 | Zinin | 370/386 |
| 6,980,537 B1 | 12/2005 | Liu | |
| 6,985,959 B1 * | 1/2006 | Lee | 709/238 |
| 7,065,059 B1 * | 6/2006 | Zinin | 370/312 |

(Continued)

FOREIGN PATENT DOCUMENTS

EP        1365551        11/2003

OTHER PUBLICATIONS

"OSPF NSR," Finding Feature Information, Jun. 10, 2011, 6 pages.

(Continued)

*Primary Examiner* — Venkatesh Haliyur
(74) *Attorney, Agent, or Firm* — Blakely Sokoloff Taylor & Zafman LLP

(57) ABSTRACT

Open Shortest Path First (OSPF) Non-stop Routing (NSR) with frozen standby LSDB is described. A network element includes a first OSPF instance initially acting as an active OSPF instance and a second OSPF instance initially acting as a standby OSPF instance. The second OSPF instance receives LSAs from the first OSPF instance and installs the LSAs in its LSDB. The LSAs in the LSDB are only aged by the active OSPF instance. If and when the second OSPF instance becomes the active OSPF instance, the second OSPF instance then ages the LSAs in the LSDB and processes each of the LSAs according to the aging of that LSA, where processing includes one of purging that LSA and refreshing that LSA.

10 Claims, 5 Drawing Sheets

(56) References Cited

U.S. PATENT DOCUMENTS

| | | | |
|---|---|---|---|
| 7,095,747 B2 * | 8/2006 | Sarmiento et al. | 370/401 |
| 7,117,241 B2 * | 10/2006 | Bloch et al. | 709/201 |
| 7,248,579 B1 * | 7/2007 | Friedman | 370/389 |
| 7,292,535 B2 * | 11/2007 | Folkes et al. | 370/238 |
| 7,363,387 B1 * | 4/2008 | Chandra et al. | 709/242 |
| 7,391,730 B1 * | 6/2008 | Chandra et al. | 370/236 |
| 7,573,811 B2 * | 8/2009 | Koppol | 370/217 |
| 7,639,680 B1 * | 12/2009 | Roy et al. | 370/389 |
| 7,787,364 B2 * | 8/2010 | Maeda et al. | 370/220 |
| 7,804,770 B2 * | 9/2010 | Ng | 370/219 |
| 7,940,650 B1 | 5/2011 | Sandhir et al. | |
| 8,199,646 B1 | 6/2012 | Cain | |
| 8,428,003 B1 | 4/2013 | Chen et al. | |
| 2002/0191616 A1 * | 12/2002 | Sarmiento et al. | 370/400 |
| 2002/0196794 A1 * | 12/2002 | Bloch et al. | 370/401 |
| 2003/0056138 A1 | 3/2003 | Ren | |
| 2003/0218982 A1 * | 11/2003 | Folkes et al. | 370/238 |
| 2004/0042395 A1 | 3/2004 | Lu et al. | |
| 2004/0136371 A1 * | 7/2004 | Muralidhar et al. | 370/389 |
| 2005/0105524 A1 | 5/2005 | Stevens et al. | |
| 2005/0265260 A1 | 12/2005 | Zinin et al. | |
| 2006/0215547 A1 * | 9/2006 | Koppol | 370/220 |
| 2007/0245034 A1 | 10/2007 | Retana et al. | |
| 2008/0056294 A1 * | 3/2008 | Maeda et al. | 370/437 |
| 2009/0086622 A1 * | 4/2009 | Ng | 370/219 |
| 2009/0116514 A1 | 5/2009 | Yan et al. | |
| 2009/0129398 A1 | 5/2009 | Riegel et al. | |
| 2009/0279536 A1 | 11/2009 | Unbehagen et al. | |
| 2009/0288098 A1 | 11/2009 | Abd-El-Malek et al. | |
| 2010/0054153 A1 | 3/2010 | White et al. | |
| 2010/0254262 A1 | 10/2010 | Kantawala et al. | |
| 2011/0026460 A1 * | 2/2011 | Lafuente Alvarez et al. | 370/328 |
| 2013/0070604 A1 * | 3/2013 | Lu et al. | 370/238 |
| 2013/0070637 A1 * | 3/2013 | Lindem et al. | 370/254 |
| 2013/0073741 A1 * | 3/2013 | Lindem et al. | 709/232 |
| 2013/0083802 A1 * | 4/2013 | Chen et al. | 370/401 |

OTHER PUBLICATIONS

"OSPF Version 2," Network Working Group Request for Comments: 2328, Ascend Communications, Inc., Apr. 1998, 245 pages.

Non-Final Office Action, U.S. Appl. No. 13/310,653, dated May 13, 2013, 31 pages.

Non-Final Office Action, U.S. Appl. No. 13/310,656 dated Jul. 9, 2013, 23 pages.

Non-Final Office Action, U.S. Appl. No. 13/345,508, dated Jul. 16, 2013, 31 pages.

Final Office Action, U.S. Appl. No. 13/310,653, dated Sep. 25, 2013, 34 pages.

European Search Report dated Jan. 7, 2013 from the European Patent Application No. 12184028.4, pp. 1-6.

Final Office Action, U.S. Appl. No. 13/310,656, dated Oct. 25, 2013; 29 pages.

Notice of Allowance, U.S. Appl. No. 13/310,653, dated Dec. 19, 2013; 38 pages.

Final Office Action, U.S. Appl. No. 13/345,508, dated Jan. 30, 2014; 35 pages.

\* cited by examiner

OSPF NON-STOP ROUTING FROZEN STANDBY

CROSS-REFERENCE TO RELATED APPLICATIONS

This application claims the benefit of U.S. Provisional Application No. 61/541,067, filed on Sep. 29, 2011, which is hereby incorporated by reference.

FIELD

Embodiments of the invention relate to the field of computer networking; and more specifically, to Non-stop Routing (NSR) using the Open Shortest Path First (OSPF) protocol, as defined in RFC 2328.

BACKGROUND

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over a larger geographic area using links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Open Shortest Path First (OSPF) routing protocol described in *Request for Comments (RFC) 2328, OSPF Version 2*, by J. Moy (1998). The OSPF protocol is based on link-state technology and, therefore, is hereinafter referred to as a link state routing protocol.

SUMMARY

Open Shortest Path First (OSPF) Non-stop Routing (NSR) with frozen standby LSDB is described. A network element includes a first OSPF instance initially acting as an active OSPF instance and a second OSPF instance initially acting as a standby OSPF instance. The second OSPF instance receives LSAs from the first OSPF instance and installs the LSAs in its LSDB. The LSAs in the LSDB are only aged by the active OSPF instance. If and when the second OSPF instance becomes the active OSPF instance, the second OSPF instance then ages the LSAs in the LSDB and processes each of the LSAs according to the age of that LSA, where processing includes one of purging that LSA and refreshing that LSA. Since there is a master (the active OSPF instance) to determine the life (refresh) and death (purge) of LSAs, it eliminates race conditions. For example, when the active OSPF instance begins to refresh an LSA but does not complete the reliable flooding, including synchronizing to the standby OSPF instance and stops operating shortly thereafter, the standby OSPF instance can pick up from its frozen LSDB and ensures that all LSAs will be processed.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
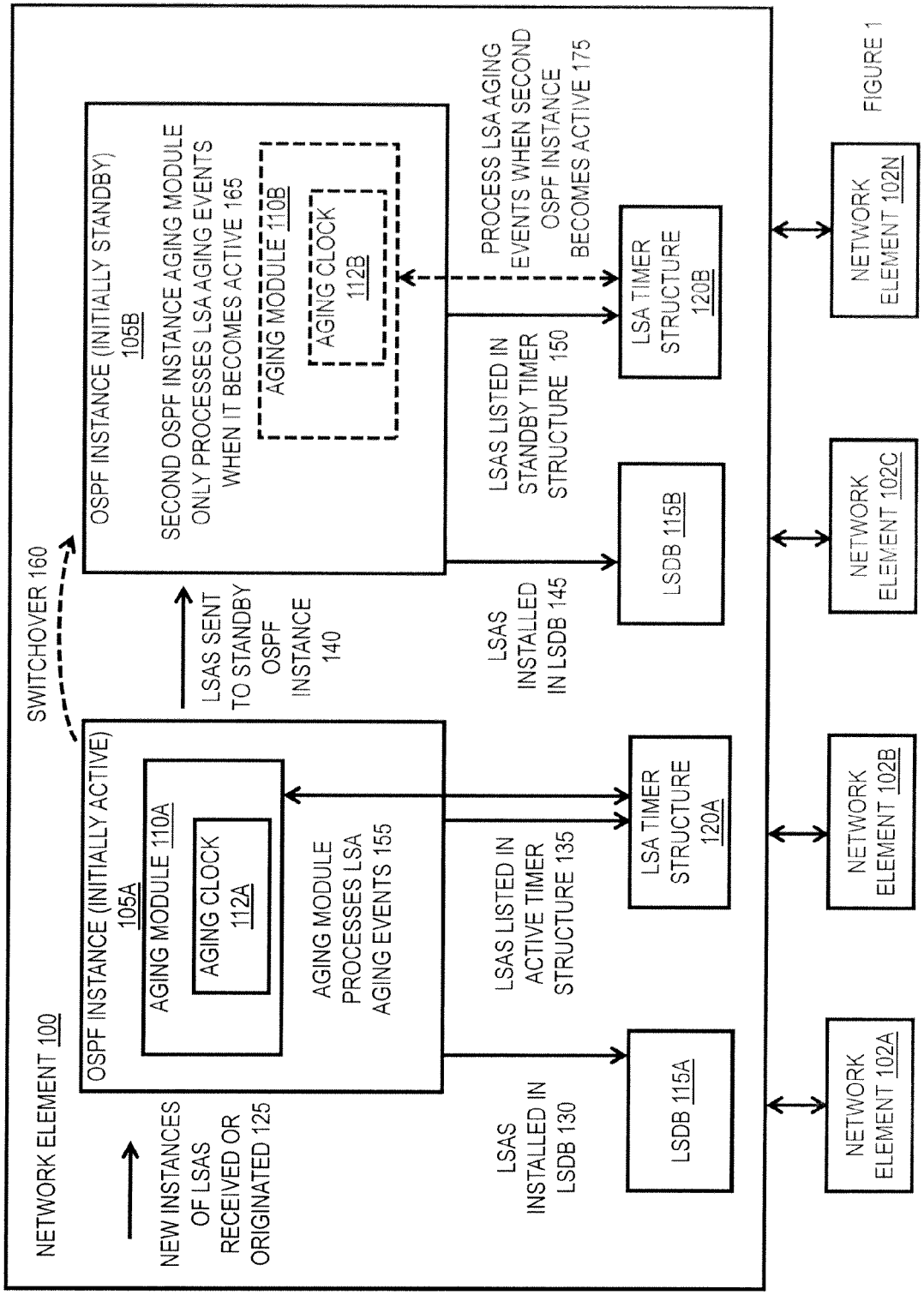
FIG. 1 illustrates an exemplary network implementing OSPF Non-stop Routing (NSR) with a frozen standby LSDB according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Each network element running the link state routing protocol maintains an identical link state database (LSDB) describing the topology of the autonomous system (AS). Each individual piece of the LSDB is a particular network element's local state, e.g., the network element's usable interfaces and reachable neighbors or adjacencies. As used herein, neighboring network elements (or "neighbors") are two network elements that have interfaces to a common network, wherein an interface is a connection between a network element and one of its attached networks. Moreover, an adjacency is a relationship formed between selected neighboring network elements for the purpose of exchanging routing information and abstracting the network topology. One or more network element adjacencies may be established over an interface.

For greater reliability, some OSPF implementations use a technique called Non-stop Routing (NSR), in which state is synchronized between an active and standby OSPF instance to assure that a failure on the active OSPF instance and switchover to the standby OSPF instance does not result in any loss of OSPF protocol synchronization.

FIG. 1 illustrates an exemplary network implementing OSPF Non-stop Routing (NSR) with a frozen standby LSDB according to one embodiment. The network includes the network elements 100 and 102A-102N. The network element 100 includes the OSPF instances 105A (the first OSPF instance) and 105B (the second OSPF instance), where the OSPF instance 105A is initially acting as the active OSPF instance and the OSPF instance 105B is initially acting as the standby OSPF instance in an NSR implementation. The OSPF instances 105A and 105B include aging modules 110A and 110B respectively, which in turn operate aging clocks 112A and 112B respectively. The aging modules 110A and 110B communicate with LSDBs 115A and 115B respectively, and with LSA timer structures 120A and 120B respectively, in a manner described in greater detail later herein.

In operation, OSPF instance 105A, acting as the active OSPF instance, receives new instances of LSAs from the network elements 102A-N and/or originates LSAs at operation 125. It then installs these LSAs in its LSDB 115A at operation 130, and lists them in its LSA timer structure 120A at operation 135.

The OSPF instance 105A also ages LSAs in its LSDB 115A and processes LSA aging events 155 when acting as the active OSPF instance. Each LSA has a lifespan of a predetermined amount (e.g., 3600 seconds). According to RFC 2328, a self-originated LSA typically needs to be refreshed and reliably flooded by the originating network element at age 1800 seconds, while an LSA originated by another network element needs to be purged from the LSDB and flooded at 3600 seconds. Thus, the OSPF instance 105A (in particular the aging module 110A of the OSPF instance 105A) refreshes self-originated LSAs at age 1800 seconds and purges LSAs received from another network element at 3600 seconds (age referring to the time elapsed since the LSA was created or updated).

In one embodiment, the aging module 110A ages LSAs based on a timer wheel structure (in such an embodiment, the LSA timer structure 120A is implemented as a timer wheel). By way of a specific example, when a new instance of an LSA is received at the OSPF instance 105A or originated by the OSPF instance 105A, the aging module 110A places that LSA into a bucket based on the time the LSA is to be refreshed or purged (assuming that the lifespan of that LSA expires). To age these LSAs, the aging module 110A processes the buckets sequentially (e.g., one bucket every 5 seconds) according to the aging clock 112A. The LSAs listed in the bucket that is currently being processed are being refreshed or purged. The LSAs in the next bucket to be processed are LSAs whose age indicates that they need to be refreshed or purged in the next timing window (e.g., 5 seconds from now).

The OSPF instance 105A synchronizes these LSAs to the standby OSPF instance 105B at operation 140. The OSPF instance 105B installs the LSAs it receives from the OSPF instance 105A in its LSDB 115B at operation 145, and lists them in its LSA timer structure 120B at operation 150 in one embodiment. In another embodiment, the LSAs are not listed in the LSA timer structure 120B.

Note that when the OSPF instance 105B is acting as the standby OSPF instance, that unlike the OSPF instance 105A, it does not process LSA aging events; the OSPF instance 105B only processes LSA aging events if and when it becomes the active OSPF instance at operation 165. Thus, when acting as the standby OSPF instance, the aging clock 112B is not running. As a result, even though an LSA may need to be refreshed or purged, the OSPF instance 105B does not refresh or purge that LSA until and unless it is acting as the active OSPF instance.

At operation 160, a switchover occurs, causing OSPF instance 105B to become the active OSPF instance. By way of example the switchover may be caused by the hardware that executes the OSPF instance 105A failing, the OSPF instance 105A crashing, or by a planned switchover. After the switchover, among other things, the second OSPF instance begins processing aging events at operation 175. Thus, the aging clock 112B is started and the LSAs listed in the LSA timer structure 120B are processed accordingly (e.g., the aging module 110B begins processing the LSAs listed in the first bucket (known as bucket zero) and sequentially processes the other LSAs as appropriate).

By way of a specific example, in one embodiment the OSPF instance 105B, when acting as a standby OSPF instance, lists each LSAs received from the active OSPF instance 105A in bucket zero of the LSA timer structure 120B. Thus, after a switchover event occurs, all LSAs are initially in bucket zero of the LSA timer structure 120B, and the aging module 110B re-orders the LSAs in the LSA timer structure 120B so that they are processed in their appropriate timing windows. Thus, the aging module 110B moves those LSAs that are not due or overdue to be processed from bucket zero to an appropriate bucket. For example, if the buckets are sequentially processed in 5 second intervals and an LSA is due to be processed in 10 seconds, the aging module 110B moves that LSA into bucket two.

An advantage provided by these embodiments is that it instruments a circumstance where there is a master (the active OSPF instance) to determine the life (refresh) and death (purge) of LSAs and as a result eliminates race conditions. For example, when the active OSPF instance begins to refresh an LSA but does not complete the reliable flooding, including synchronizing to the standby OSPF instance and stops operating shortly thereafter, the standby OSPF instance can pick up from its frozen LSDB and ensures that all LSAs will be processed.

Figure 2:
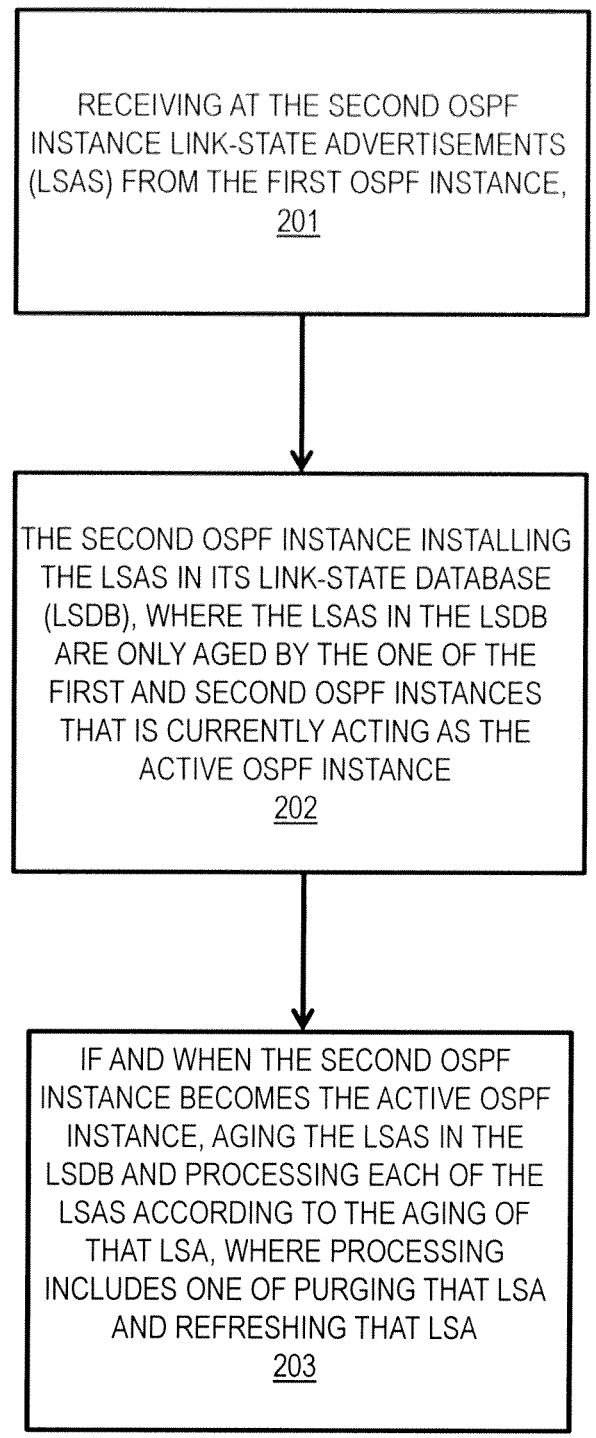
FIG. 2 describes exemplary operations for OSPF non-stop routing with a frozen standby LSDB according to one embodiment.

FIG. 2 describes exemplary operations for OSPF non-stop routing with a frozen standby LSDB according to one embodiment. The operations of this flow diagram and other flow diagrams will be described with reference to the exemplary embodiments of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

At step 201, the OSPF instance 105B (currently acting as the standby OSPF instance) receives new instances of LSAs from the OSPF instance 105A (currently acting as the active OSPF instance). These LSAs may reflect a new LSA to be installed in the LSDB 115B, an update to an LSA that exists in the LSDB 115B (e.g., the LSA has been refreshed), and/or that an LSA is to be removed from the LSDB 115B (e.g., the LSA is to be purged). Flow then moves to step 202.

At step 202, the OSPF instance 105B installs the LSAs in its LSDB 115B. The step of installing may include adding the LSA to the LSDB 115B or updating an existing LSA in the LSDB 115B. The OSPF instance 105B, since it is currently acting as the standby OSPF instance, does not age the LSAs in the LSDB 115B (the OSPF instance 105A ages the LSAs in its LSDB 115A since it is currently acting as the active OSPF instance). Flow then moves to step 203.

At step 203, which only occurs if and when the OSPF instance 105B becomes the active OSPF instance, the OSPF instance 105B (now the new active OSPF instance) ages the LSAs in the LSDB 115B and processes each of them according to the aging of that LSA (the time elapsed since that LSA was created or updated). Processing may include either purging that LSA or refreshing that LSA.

Figure 3:
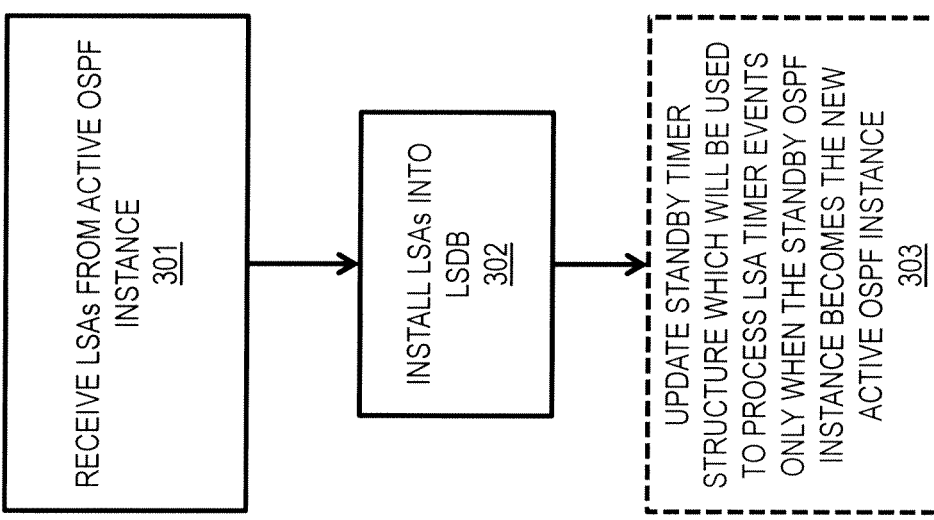
FIG. 3 describes exemplary operations performed by the standby OSPF instance prior to a switchover in one embodiment of the invention.

FIG. 3 describes exemplary operations performed by the standby OSPF instance prior to a switchover in one embodiment of the invention. At step 301, the OSPF instance 105B, which is currently acting as the standby OSPF instance, receives LSAs from the OSPF instance 105A, which is currently acting as the active OSPF instance. Next, flow moves to step 302.

At step 302, the OSPF instance 105B installs the LSA into its LSDB 115B. Flow then moves to step 303, where the OSPF instance 105B updates its LSA timer structure 120B by listing the LSAs in it. By way of a specific example, the OSPF instance 105B lists all new instances of LSAs received from the OSPF instance 105A in bucket zero (the first timing window) of the LSA timer structure 120B. The LSA timer structure 120B will only be used to process LSA timer events when the OSPF instance 105B becomes the new active OSPF instance.

Figure 4:
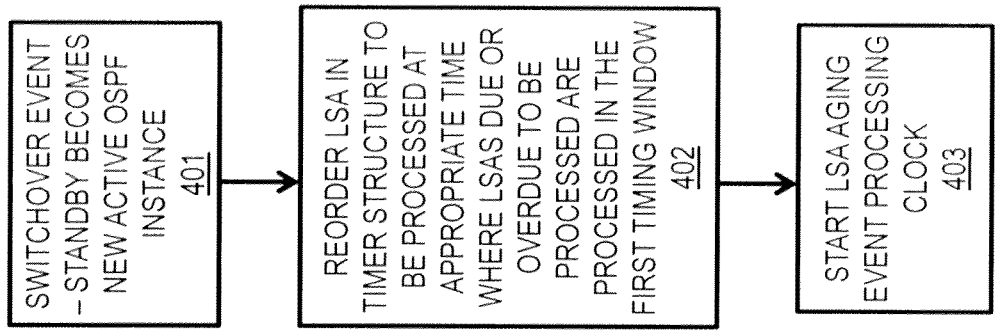
FIG. 4 describes exemplary operations performed by the standby OSPF instance after a switchover event according to one embodiment of the invention.

FIG. 4 describes exemplary operations performed by the standby OSPF instance after a switchover event according to one embodiment of the invention. At step 401, a switchover event occurs, and the OSPF instance 105B, which was the standby OSPF instance, becomes the new active OSPF instance. Flow then moves to step 402.

At step 402, the OSPF instance 105B reorders the LSA in its LSA timer structure 120B to be processed at the appropriate time. For example, LSAs that are currently due or overdue to be processed are processed in the first timing window (e.g., bucket zero) (that is, the timing window that will be processed immediately after the new active OSPF instance begins processing LSAs). The LSAs that are not currently due or overdue to be processed are moved to be processed in the appropriate timing window (e.g., moved from bucket zero to the appropriate bucket). Flow then moves to step 403, where the OSPF instance 105B starts the LSA aging event processing clock 122B, and begins processing LSAs as the active OSPF instance.

Figure 5:
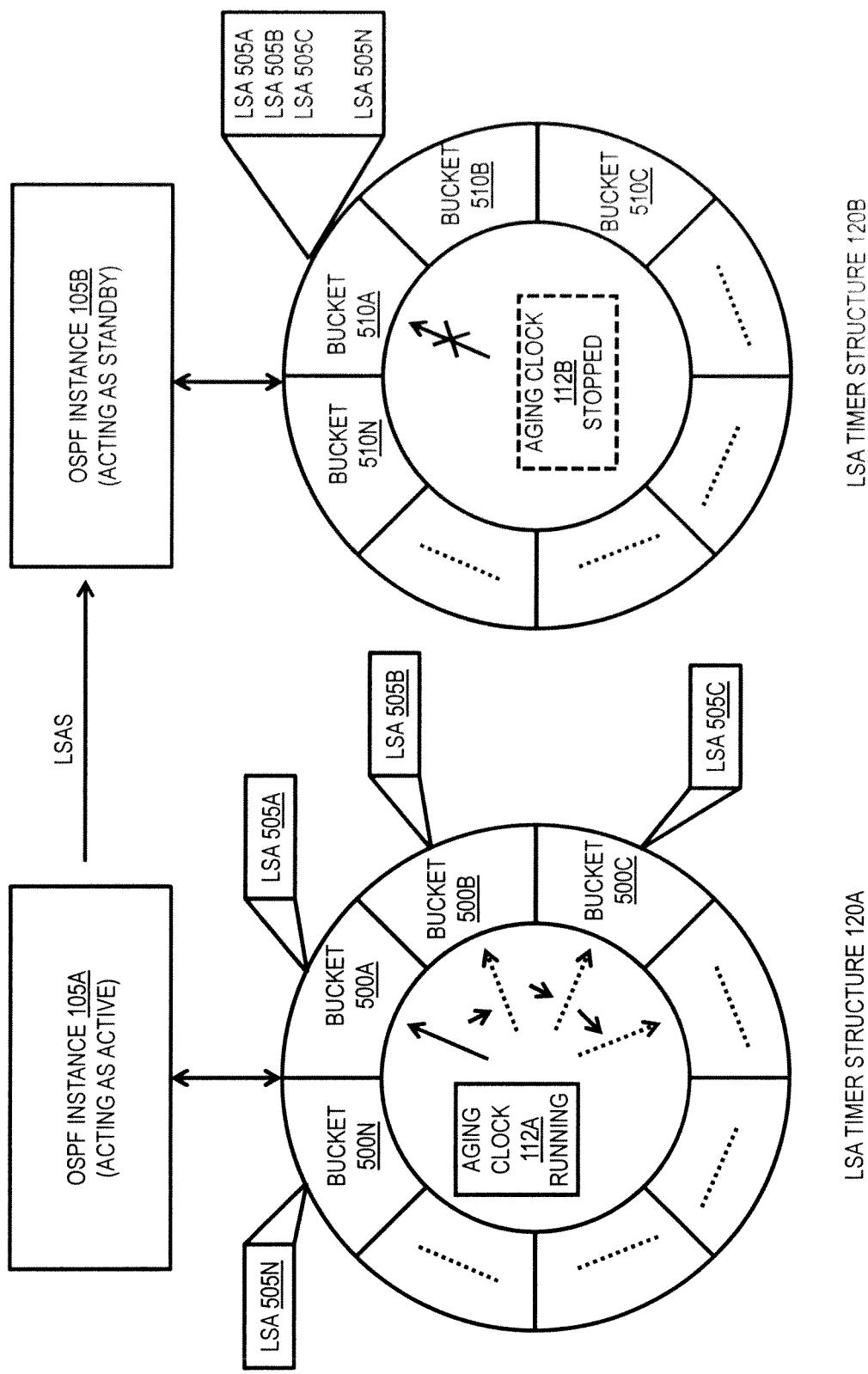
FIG. 5 illustrates the operation of the LSA timer structures according to one embodiment of the invention.

FIG. 5 illustrates the operation of the LSA timer structures in an active OSPF instance and a standby OSPF instance according to one embodiment of the invention. As illustrated in FIG. 5, the LSA timer structures 120A and 120B are implemented as timer wheels. The OSPF instance 105A (operating as the active OSPF instance) lists the LSAs 505A-505N in buckets 500A-500N respectively according to their lifespan expirations. As LSAs 505A-505N (which are new LSA instances) are received at the active OSPF instance 105A, the LSAs are added to the appropriate bucket in the LSA timer structure 120A. The OSPF instance 105A uses the aging clock 112A to process the LSAs in buckets 500A-500N at the appropriate times. For example, the OSPF instance 105A processes the LSAs listed in bucket 500A (which represents the first timing window (e.g., bucket zero)), which are LSAs that currently need to be purged or refreshed (their lifespan has expired). The LSAs listed in bucket 500B will need to be purged or refreshed in the next timing window (e.g., in 5 seconds), the LSAs listed in bucket 500C will need to be purged or refreshed in the following timing window, and so on.

Meanwhile, OSPF instance 105B (operating as the standby OSPF instance) lists the LSAs 505A-505N in bucket 510A, which represents the first timing window (e.g., bucket zero). Furthermore, aging clock 112B is stopped as indicated by the dashed markings in FIG. 5, or alternatively LSA timing structure 120B is not advanced. Since the standby LSDB is not aged (it is frozen), there is no advantage of placing the LSAs into different buckets. Thus, in one embodiment, the OSPF instance 105B does not distribute the LSAs among the various buckets 510B-510N of timer structure 120B. Aging clock 112B is stopped, and the LSAs in the LSDB 115B are not aged.

Figures 6, 7:
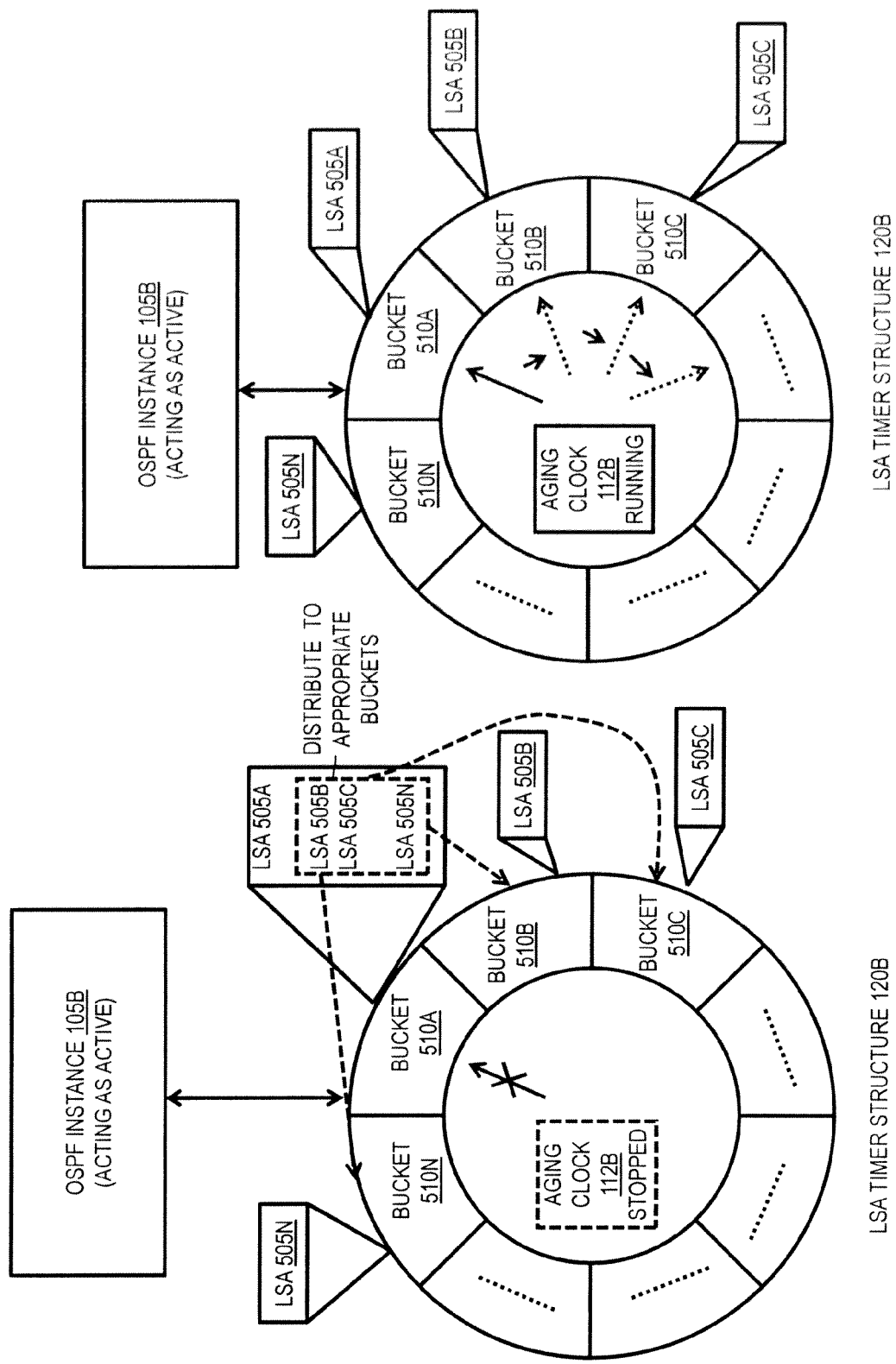
FIG. 6 illustrates the operation of the new active timer structure immediately after switchover according to one embodiment of the invention.
FIG. 7 illustrates the operation of the new active timer structure after the LSAs are distributed as shown in FIG. 6 according to one embodiment of the invention.

FIG. 6 illustrates exemplary operations of the LSA timer structure after switchover according to one embodiment of the invention. The OSPF instance 105B, which is now operating as the new active OSPF instance, distributes the LSAs 505B-505N, previously listed in bucket 510A, according to their age (the time elapsed since the LSA was created or updated) to the proper buckets 510B-510N in the timer structure. LSAs that are due or overdue to be purged or refreshed remain in bucket 510A (the first timing window) while the other LSAs are moved to the appropriate bucket to be processed (refreshed or purged) at the appropriate time. For example, LSA 505A, remains in bucket 510A (it is due or overdue to be processed) and LSAs 505B-N are moved to buckets 510B-N respectively. In one embodiment, during the distribution of the LSAs, aging clock 112B remains stopped.

FIG. 7 illustrates the operation of the LSA timer structure after the LSAs are distributed as shown in FIG. 6 according to one embodiment of the invention. Aging clock 112B is running and the OSPF instance 105B processes the LSAs according to their buckets in a similar way as the OSPF instance 105A processed LSAs.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element for open shortest path first (OSPF) non-stop routing, wherein the network element includes a first OSPF instance initially acting as an active OSPF instance and a second OSPF instance initially acting as a standby OSPF instance, the method comprising the steps of:
receiving, at the second OSPF instance, a plurality of link-state advertisements (LSAs) from the first OSPF instance;
the second OSPF instance installing the LSAs in its link-state database (LSDB), wherein the LSAs in the LSDB are not aged by the second OSPF instance when acting as the standby OSPF instance; and
responsive to the second OSPF instance becoming the active OSPF instance, the second OSPF instance performing the following steps:
aging the LSAs in the LSDB, and
processing each of the LSAs according to the aging of that LSA, wherein processing includes one of purging that LSA and refreshing that LSA,
wherein aging the LSAs include listing the LSAs in a timer structure having a plurality of buckets that are processed sequentially according to an aging clock,
wherein each LSA is listed in one of the plurality of buckets according to an age of that LSA,
wherein the aging clock is not running when the second OSPF instance is acting as the standby OSPF instance, and
wherein the second OSPF instance, when operating as the standby OSPF instance, lists each LSA received from the first OSPF instance in one of the buckets that will be first processed when the second OSPF instance becomes the active OSPF instance.

2. The method of claim 1, wherein the second OSPF instance, when it becomes the active OSPF instance, performs the following:
moving the received LSAs into appropriate buckets to be processed at an appropriate time.

3. The method of claim 2, wherein the second OSPF instance, responsive to it becoming the active OSPF instance, processes those LSAs listed in the timer structure that are due or overdue to be processed in a first timing window.

4. An apparatus, comprising:
a network element supporting open shortest path first (OSPF) non-stop routing with a first OSPF instance that is configured to initially act as an active OSPF instance and a second OSPF instance that is configured to initially act as a standby OSPF instance, the network element including one or more processors configured to implement:
the first OSPF instance including a first aging module, wherein the first OSPF instance is configured to install link-state advertisements (LSAs) in a first link-state database (LSDB) associated with the first OSPF instance and synchronize the LSAs with the second OSPF instance, and wherein the first aging module is configured to, while the first OSPF instance is acting as the active OSPF instance, age LSAs in the first LSDB and process each one of those LSAs according to the aging including one of purging that LSA and refreshing that LSA; and
the second OSPF instance coupled with the first OSPF instance and including a second aging module, wherein the second OSPF instance is configured to install those LSAs synchronized from the first OSPF instance in a second LSDB associated with the second OSPF instance, and wherein the second aging module is configured to process LSA aging events for the LSAs in the second LSDB only when the second OSPF instance becomes the active OSPF instance.

5. The network element of claim 4, wherein the first OSPF instance further includes:
a first timer structure having a first plurality of buckets, wherein the first aging module is configured to list each LSA it synchronizes with the second OSPF instance in the first timer structure in an appropriate one of the first plurality of buckets based on a time when that LSA is to be refreshed or purged; and
a first aging clock configured to cause the first aging module to process the LSAs listed in an LSA timer structure.

6. The network element of claim 5, wherein the second OSPF instance further comprises:
a second timer structure having a second plurality of buckets, wherein the second aging module is configured to, when the second OSPF instance is acting as the standby OSPF instance, list each LSA it receives from the first OSPF instance in a same one of the second plurality of buckets; and
a second aging clock configured to be inactive when the second OSPF instance is acting as the standby OSPF instance such that the LSAs listed in the second timer structure will not be processed by the standby OSPF instance; and
wherein the second aging module is configured to, when the second OSPF instance is acting as the standby OSPF instance, activate the second aging clock to cause the second aging module to process the LSA aging events.

7. The network element of claim 5, wherein the second OSPF instance is further configured to, upon becoming the active OSPF instance, distribute each LSA that is listed in a second timer structure and is not due or overdue to be processed to an appropriate one of a second plurality of buckets of the second timer structure according to the age of that particular LSA.

8. The network element of claim 7, wherein the second OSPF instance, responsive to it becoming the active OSPF instance, processes those LSAs listed in the second timer structure that are due or overdue to be processed in a first timing window.

9. A method in a network element for open shortest path first (OSPF) non-stop routing comprising:
receiving, at a first OSPF instance that is currently acting as a standby OSPF instance, a link-state advertisement (LSA) from a second OSPF instance that is currently acting as an active OSPF instance;
the first OSPF instance storing that LSA in a link-state database (LSDB), wherein that LSA is not aged by the first OSPF instance until and unless the first OSPF instance becomes the active OSPF instance;
responsive to the first OSPF instance becoming the active OSPF instance, the first OSPF instance performing the following:
aging that LSA, and
processing that LSA according to the age of that LSA, wherein the step of processing includes one of purging that LSA and refreshing that LSA,
wherein the step of aging the LSA includes listing that LSA in one of a plurality of buckets of a timer structure that are processed sequentially according to an aging clock, wherein the LSA is listed in that one bucket according to the age of the LSA,
wherein the aging clock of the first OSPF instance is not running when the first OSPF instance is acting as the standby OSPF instance, and
wherein the first OSPF instance, when operating as the standby OSPF instance, lists the LSA received from the second OSPF instance in one of a plurality of buckets of a timer structure that will be first processed when the first OSPF instance becomes the active OSPF instance.

10. The method of claim 9, wherein the first OSPF instance, when it becomes the active OSPF instance, performs the following:
moving the received LSA into an appropriate one of the buckets to be processed at an appropriate time.

* * * * *